United States Patent Office 2,928,837
Patented Mar. 15, 1960

2,928,837

TETRAHYDROPYRIDO,1,5-BENZODIAZEPINE-2-(3)-ONE

Rolf Kallischnigg, Hamburg, Germany, assignor to Chemische Fabrik Promonta G.m.b.H., Hamburg, Germany, a firm of Germany No Drawing. Application August 27, 1957
Serial No. 680,617

Claims priority, application Germany August 29, 1956

9 Claims. (Cl. 260—296)

This invention relates to new diazepine derivatives and a method for preparing the same.

The term "diazepine" for unsaturated seven-membered rings including two nitrogen atoms, corresponds to the conventional nomenclature used for example in the Chemical Abstracts. The basic compound of the products here in question is described in the Chemical Abstracts, volume 36 (1942), column 4115, Section 6 (W. A. Sexton, J. Chem. Soc. 1942, pages 303–304) as compound (IV) and is listed in the Subject Index of said volume 36 of the Chemical Abstracts as 1,5-benzodiazepine-2-(3)-one on page 7843 in the middle column where the structural formula of benzodiazepine is also reproduced.

The substances embodying the present invention are basic tricyclic diazepine compounds corresponding to the following general structural formula:

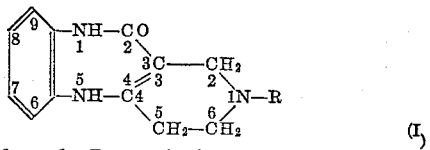

In the above formula R stands for a saturated or unsaturated aliphatic or cycloaliphatic (hydroaromatic) hydrocarbon radical, or an aryl or aralkyl radical and the phenolic ring of the benzodiazepine compound can be substituted by alkyl and/or alkoxy groups and/or hydroxy groups and/or a halogen.

According to the present invention the novel compounds of the invention are prepared by condensing an unsubstituted or C-substituted ortho-phenylene diamine having the formula

with a N-substituted piperidon-4-carboxylic acid-3-alkyl ester corresponding to the formula

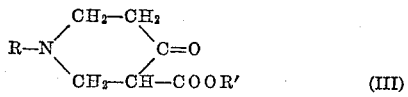

in such a manner that from the two amino groups of the orthophenylene diamine and the enol-form of the piperidon carboxylic acid ester, in one case alcohol and in the other case water is eliminated. In the above Formula III R has the meaning explained above in connection with the above Formula I and R' stands for a lower alkyl. The reaction takes place according to the following scheme:

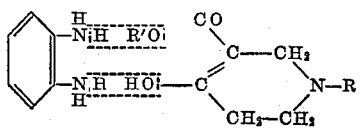

It has been found that this condensation can be carried out in inert organic solvents with the evolution of heat. It is preferred to carry out condensation in boiling xylene.

The following examples illustrate some embodiments of and some best modes for carrying out the invention, to which the invention is not limited.

EXAMPLE 1

*3,4 - [3'4' - (1' - methyl - 1'2'5'6' - tetrahydropyrido)]-1,5-benzodiazepine-(3)-2-one*

Into a 2-liter distilling flask or apparatus provided with a dropping funnel 88 grams of ortho-phenylene diamine and 1 liter of dry xylene are introduced and the solution is heated to such an extent that the xylene slowly distills over. Into said apparatus—during 5 to 6 hours—130 grams of 1-methylpiperidone-4-carboxylic acid-3-ethyl ester in 2 liters of xylene are dropwise added in such a manner that after the end of the reaction a total amount of 2.5 liters of xylene is distilled off. The continuously distilled off xylene removes the alcohol and water formed during condensation. The residual solution is treated at once with active carbon, filtered in hot condition and then cooled. Upon cooling the compound formed crystallizes, is filtered off and washed with ether or a small amount of acetic ester. By concentration of the mother liquor and recrystallization from alcohol 134 grams (72% of the theory) of slightly yellow crystals are obtained which are scarcely soluble in benzine ether or water, but can be well crystallized from alcohol, acetic ester, ketones or benzene. The melting point is 182–184° C.

EXAMPLE 2

*3,4 - [3'4' - (1' - ethyl - 1'2'5'6' - tetrahydropyrido)]-1,5-benzodiazepine-(3)-2-one*

In the manner and under the conditions described in the above Example 1, 55 grams of ortho-phenylene diamine in 1 liter of xylene are condensed with 100 grams of 1-ethyl-piperidone-4-carboxylic acid-3-ethyl ester in 1.5 liters of xylene, in such a manner that in the course of 5 hours 2 liters of xylene are distilled off. The benzodiazepine base thus formed separates by crystallization from the concentrated xylene solution and is then recrystallized from alcohol-acetic ester. The melting point is 139–140° C. and the yield amounts to 59% of the theory.

EXAMPLE 3

*3,4-[3'4'-(1'-n-butyl-1'2'5'6'-tetrahydropyrido)]-1,5-benzodiazepine-(3)-2-one*

In the manner and under the conditions described in the above Example 1, 51 grams of ortho-phenylene diamine in 1 liter xylene and 100 grams of 1-n-butyl-piperidone-4-carboxylic acid-3-methyl ester in 2 liters of xylene are condensed in such a manner that in the course of 5 hours 2.5 liters of xylene are distilled off. The compound formed separates from the residual solution by crystallization and recrystallized from acetic ester. The melting point is 146–147° C. and the yield amounts to 61% of the theory.

EXAMPLE 4

*3,4-[3'4'-(1'-allyl-1'2'5'6'-tetrahydropyrido)]-1,5-benzodiazepine-(3)-2-one*

In the manner and under the conditions described in the above Example 1, 88 grams of ortho-phenylene diamine in 1 liter of xylene and 171 grams of 1-allyl-piperidone-4-carboxylic acid-3-ethyl ester in 2 liters of xylene are condensed in such a manner that during the course of the reaction 2.5 liters of xylene are distilled off. The compound thus formed separates from the residual solution by crystallization and is recrystallized from alcohol. The yield amounts to 66% of the theory and the melting point is 144–145° C.

EXAMPLE 5

*3,4-[3'4'-(1'phenyl-1'2'5'6'-tetrahydropyrido)]-1,5-benzodiazepine-(3)-2-one*

Under the conditions and in the manner described in the above Example 1, 40 grams of ortho-phenylene diamine in 1 liter of xylene and 93 grams of 1-phenyl-piperidone-4-carboxylic acid-3-ethyl ester in 2 liters of xylene, are condensed in such a manner that in the course of 4 hours 2 liters of xylene slowly distill over. The compound formed separates from the residual solution by crystallization and is recrystallized from tetrahydronaphthalene. The substance, which is obtained with a yield of 83% of the theory, melts at 248–250° C. with decomposition.

EXAMPLE 6

*3,4-[3'4'-(1'-cyclohexyl-1'2'5'6'-tetrahydropyrido)]-1,5-benzodiazepine-(3)-2-one*

Under the conditions and in the manner described in the above Example 1, 30 grams of ortho-phenylene diamine in 1 liter of xylene and 78 grams of 1-cyclohexyl-piperidone-4-carboxylic acid-3-ethyl ester in 1 liter of xylene are condensed in such a manner that during condensation 1.5 liters of xylene are slowly distilled off. The residual xylene is removed under slight vacuum and the residue is boiled with acetic ester. The compound formed separates by crystallization and is recrystallized from acetic ester. The melting point is 127–128° C. and the yield amounts to 41% of the theory.

EXAMPLE 7

*3,4-[3'4'-(1'-benzyl-1'2'5'6'-tetrahydropyrido)]-1,5-benzodiazepine-(3)-2-one*

Under the reaction conditions and in the manner described in the above Example 1, 44 grams of ortho-phenylene diamine in 1 liter of xylene and 100 grams of 1-benzylpiperidone-4-carboxylic acid-3-methyl ester in 2 liters of xylene, are subjected to condensation, whereby a total amount of 2.5 liters of xylene are slowly distilled off. The base separated by crystallization from the concentrated xylene solution is recrystallized from isopropanol. The melting point of the base is 165–166° C. and the yield amounts to 75% of the theory.

EXAMPLE 8

*3,4-[3'4'-(1'-β-phenylethyl-1'2'5'6'-tetrahydropyrido)]-1,5-benzodiazepine-3-(2)-one*

Under the reaction and process conditions described in the above Example 1, 30 grams of ortho-phenylene diamine in 1 liter of xylene and 77 grams of 1,β-phenyl-ethyl-piperidone-4-carboxylic acid-3-ethyl ester in 1 liter xylene are condensed in such a manner that a total amount of 1.5 liters of xylene slowly distills off during condensation. The desired compound crystallizes from the residual solution and is recrystallized from benzene. It has a melting point of 183–184° C. and is obtained in a yield of 66% of the theory.

EXAMPLE 9

*3,4-[3'4'-(1'-benzyl-1'2'5'6'-tetrahydropyrido)]-7-(8)-methyl-1,5-benzodiazepine-(3)-2-one*

Under the conditions and in the manner described in the above Example 1, 38 grams of 3,4-diamino-toluene in 1 liter of xylene are condensed with 70 grams of 1-benzylpiperidone-4-carboxylic acid-3-methylester in 1.5 liters of xylene in such a manner that during condensation 2 liters of xylene are slowly distilled off. The residual xylene is removed under slight vacuum and the residue is treated with ether. The product formed by crystallization consists of the two expected isomers, which can be separated by crystallization. One isomer—denoted A—which is difficultly soluble in alcohol, is recrystallized from alcohol. It has a melting point of 129–130° C. and is obtained in a yield of 42% of the theory. The other isomer (denoted B) is easier soluble in alcohol and is recrystallized from dibutyl ether. It melts at 117–118° C. and is obtained in a yield of 13% of the theory.

EXAMPLE 10

*3,4-[3'4'-(1'-methyl-1'2'5'6'-tetrahydropyrido)]-7,8-dimethoxy-1,5-benzodiazepine-(3)-2-one*

Under the reaction and process conditions described in the above Example 1, 63 grams of 4,5 dimethoxy-1,2-diaminobenzene in 1 liter of xylene and 75 grams of 1-methylpiperidone-4-carboxylic acid-3-methylester in 1 liter of xylene, are condensed, whereby a permanent current of nitrogen is passed through the apparatus and 1.5 liters of xylene are slowly distilled off. The residual xylene is removed under slight vacuum, the residue is boiled with acetic ester and treated with active carbon. Upon cooling, the desired compound separates from the acetic ester solution by crystallization and is recrystallized from alcohol. It has a melting point of 173–174° C. and is obtained in a yield of 48% of the theory.

EXAMPLE 11

*3,4-[3'4'-(1'-phenyl-1'2'5'6'-tetrahydropyrido)]-7-(8)-chloro-1,5-benzodiazepine-(3)-2-one*

Under the reaction and process conditions described in the above Example 1, 37 grams of 4-chloro-ortho-phenylene diamine in 1 liter of xylene and 75 grams of 1-phenylpiperidone-4-carboxylic acid-3-ethylester in 1 liter of xylene, are condensed in such a manner that during the reaction 1.5 liters of xylene are slowly distilled off. From the residual xylene solution the desired compound quantitatively separates by crystallization in form of the isomer A. This compound is recrystallized from methyl ethyl ketone. It melts at 219–220° C. under decomposition and is obtained in a yield of 65% of the theory.

The second isomer (isomer B) is obtained by complete concentration of the above mentioned xylene mother liquor and recrystallization of the residue from methanol. This second isomer has a melting point of 233–235° C. and is obtained in a yield of 8% of the theory.

The compounds embodying the present invention are useful for therapeutic applications, particularly as agents for lowering blood pressure in the human organism, e.g. by administration per os or by subcutaneous injection.

The compounds embodying the present invention yield with organic or inorganic acids salts which are easily soluble in water. For example, the hydrochloride obtained from the base prepared according to the above Example 1, can be separated from alcohol and has a melting point of 252–254° C.

It will be understood from the above that this invention is not limited to the substances, conditions, proportions and other details specifically described above and can be carried out with various modifications without departing from the scope of the invention, as defined in the appended claims. As mentioned above, the process of the invention can be carried out in various inert organic solvents.

As examples of such inert organic solvents toluene or dibutyl ether are mentioned. Such solvents can be partly or completely substituted for xylene in the above examples.

What is claimed is:

1. As a new product, a basic, tricyclic diazepine compound corresponding to the general formula

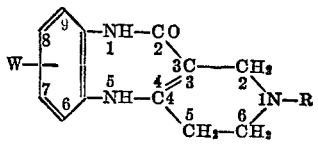

where R is a member of the group consisting of lower alkyl, lower alkenyl, cyclohexyl, phenyl and phenyl-lower alkyl and W is a member of the group consisting of lower alkyl, lower alkoxy, hydroxy, halogen and hydrogen.

2. As a new compound, 3,4-[3'4'-(1'-methyl-1'2'5'6'-tetrahydropyrido)]-1,5-benzodiazepine-(3)-2-one.

3. As a new compound, 3,4-[3'4'-(1'-phenyl-1'2'5'6'-tetrahydropyrido)]-1,5-benzodiazepine-(3)-2-one.

4. As a new compound, 3,4-[3'4'-(1'-cyclohexyl-1'2'5'6'-tetrahydropyrido)]-1,5-benzodiazepine-(3)-2-one.

5. As a new compound, 3,4-[3'4'-(1'-benzyl-1'2'5'6'-tetrahydropyrido)]-7-(8)-methyl-1,5-benzodiazepine-(3)-2-one.

6. As a new compound, 3,4-[3'4'-(1'-methyl-1'2'5'6'-tetrahydropyrido)]-7,8-dimethoxy-1,5-benzodiazepine-(3)-2-one.

7. As a new compound, 3,4-[3'4'-(1'-phenyl-1'2'5'6'-tetrahydropyrido)]-7-(8)-chloro-1,5-benzodiazepine-(3)-2-one.

8. A process for preparing a basic, tricyclic diazepine compound of the general formula

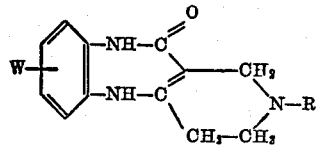

where R is a member of the group consisting of lower alkyl, lower alkenyl, cyclohexyl, phenyl and phenyl-lower alkyl and W is a member of the group consisting of lower alkyl, lower alkoxy, hydroxy, halogen and hydrogen, which comprises condensing a compound of the formula

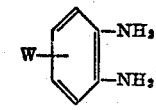

where W is as above defined, with an N-substituted piperidone-4-carboxylic acid-3-alkyl-ester of the formula

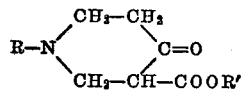

wherein R has the meaning defined above and R' stands for a lower alkyl radical, said condensation being carried out under heating in an inert organic solvent.

9. A process as claimed in claim 8, in which condensation is carried out in boiling xylene.

No references cited.

UNITED STATES PATENT OFFICE
CERTIFICATION OF CORRECTION

Patent No. 2,928,837                                   March 15, 1960

Rolf Kallischnigg

It is hereby certified that error appears in the above numbered patent requiring correction and that the said Letters Patent should read as corrected below.

In the heading to the printed specification, lines 2 and 3, title of invention, for "TETRAHYDROPYRIDO,1,5-BENZODIAZEPINE-2-(3)-ONE" read -- TETRAHYDROPYRIDO-1,5-BENZODIAZEPINE-(3)-2-ONE --; column 1, lines 67 to 71, the formula should appear as shown below instead of as in the patent:

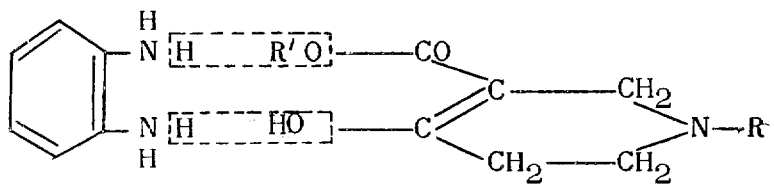

column 2, line 17, for "130" read -- 150 --; column 3, second line of the heading of Example 8, for "1,5-benzodiazepine-3-(2)-one" read -- 1,5-benzodiazepine-(3)-2-one --.

Signed and sealed this 23rd day of May 1961.

(SEAL)
Attest:

ERNEST W. SWIDER                                DAVID L. LADD
Attesting Officer                           Commissioner of Patents